(12) United States Patent
Kamoi (10) Patent No.: US 10,543,599 B2
(45) Date of Patent: Jan. 28, 2020

(54) ROBOT SYSTEM EQUIPPED WITH VIDEO DISPLAY APPARATUS THAT DISPLAYS IMAGE OF VIRTUAL OBJECT IN SUPERIMPOSED FASHION ON REAL IMAGE OF ROBOT

(71) Applicant: FANUC CORPORATION, Yamanashi (JP)

(72) Inventor: Toshiaki Kamoi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 103 days.

(21) Appl. No.: 15/371,760

(22) Filed: Dec. 7, 2016

(65) Prior Publication Data

US 2017/0165841 A1    Jun. 15, 2017

(30) Foreign Application Priority Data

Dec. 10, 2015    (JP) .................................. 2015-241007

(51) Int. Cl.
```
G06F 19/00      (2018.01)
B25J 9/16       (2006.01)
G06T 19/00      (2011.01)
H04N 5/232      (2006.01)
H04N 7/18       (2006.01)
```

(52) U.S. Cl.
CPC ........... *B25J 9/1697* (2013.01); *G06T 19/006* (2013.01); *H04N 5/23293* (2013.01); *H04N 7/183* (2013.01)

(58) Field of Classification Search
CPC ... B25J 9/1697; H04N 7/183; H04N 5/23293; G06T 19/006
See application file for complete search history.

(56) References Cited

U.S. PATENT DOCUMENTS

| 7,298,385 B2 | 11/2007 | Kazi et al. | |
|---|---|---|---|
| 7,818,091 B2 * | 10/2010 | Kazi | B25J 9/1697 318/568.1 |
| 9,030,492 B2 | 5/2015 | Bischoff et al. | |
| 9,415,509 B2 | 8/2016 | Krause et al. | |
| 2004/0189631 A1 * | 9/2004 | Kazi | B25J 9/1671 345/418 |

(Continued)

FOREIGN PATENT DOCUMENTS

| CN | 102350700 A | 2/2012 |
|---|---|---|
| CN | 103302668 A | 9/2013 |

(Continued)

*Primary Examiner* — Ian Jen
(74) *Attorney, Agent, or Firm* — RatnerPrestia (57) ABSTRACT

A robot system according to the present invention comprises a control apparatus for controlling a robot, and a video display apparatus connected to the control apparatus. The video display apparatus comprises a display unit which displays an image of a real space containing the robot, in real time as the image is taken by a camera, and an augmented reality image processing unit which causes a virtual image of an end effector or robot peripheral equipment of the robot to be displayed on the display unit in superimposed fashion on a real image of the robot taken by the camera. According to the robot system, even when the end effector or the robot peripheral equipment is not present, a robot teaching task can be performed by assuming that they are present.

7 Claims, 4 Drawing Sheets

(56) References Cited

U.S. PATENT DOCUMENTS

| | | | |
|---|---|---|---|
| 2004/0189675 A1 | 9/2004 | Pretlove et al. | |
| 2005/0131582 A1 | 6/2005 | Kazi et al. | |
| 2012/0290130 A1* | 11/2012 | Kapoor | B25J 9/1671 700/247 |
| 2014/0277737 A1* | 9/2014 | Sekiyama | B25J 9/1697 700/259 |

FOREIGN PATENT DOCUMENTS

| | | |
|---|---|---|
| CN | 104057453 A | 9/2014 |
| DE | 10305384 A1 | 8/2004 |
| DE | 10345743 A1 | 5/2005 |
| DE | 102005009437 A1 | 9/2006 |
| DE | 102012110508 A1 | 5/2013 |
| EP | 2783812 A2 | 10/2014 |
| JP | H03213278 A | 9/1991 |
| JP | 2004243516 A | 9/2004 |
| JP | 4850984 B | 1/2012 |
| JP | 2014-180707 A | 9/2014 |
| KR | 1007086351 B1 | 12/2007 |

\* cited by examiner

ROBOT SYSTEM EQUIPPED WITH VIDEO DISPLAY APPARATUS THAT DISPLAYS IMAGE OF VIRTUAL OBJECT IN SUPERIMPOSED FASHION ON REAL IMAGE OF ROBOT

BACKGROUND OF THE INVENTION

1. Field of the Invention

The present invention relates to a robot system equipped with a video display apparatus that displays an image of a virtual object in superimposed fashion on a real image of a robot by using augmented reality technology.

2. Description of the Related Art

In an industrial robot system installed at a manufacturing site, an end effector, such as a robot hand or a machining tool, is attached to the forward end of a robot arm. Further, robot peripheral equipment, such as a belt conveyor or a rail-guided cart, is arranged in the vicinity of the robot.

However, at the stage of teaching the robot a sequence of actions necessary to accomplish a task, the end effector or the robot peripheral equipment may not yet be made available. In this case, the operator is unable to perform an appropriate robot teaching task until the end effector or the robot peripheral equipment is made available. Accordingly, even when the end effector or the robot peripheral equipment is not available, it is desired to be able to perform the robot teaching task by assuming that they are present.

Augmented reality technology that allows a virtual image to be displayed in superimposed fashion on a real-time image is one technology that has the potential to be able to solve the above problem. In fact, apparatus configured to enhance operability at the time of a robot teaching task by using such augmented reality technology have been proposed in recent years.

For example, Japanese Patent No. 4850984 discloses a technique that displays the operating scope of a robot operating in accordance with an operation plan by superimposing the space on an image of a real robot by using augmented reality. Further, Japanese Patent Application Laid-open No. 2014-180707 discloses a technique that displays the motion path of a robot operating in accordance with an operation program by superimposing the path on an image of a real robot by using augmented reality.

However, neither Japanese Patent No. 4850984 nor Japanese Patent Application Laid-open No. 2014-180707 proposes techniques for displaying an image of an end effector or robot peripheral equipment as described above, in superimposed fashion on an image of a real robot by using augmented reality technology.

SUMMARY OF THE INVENTION

An object of the present invention is to provide a robot system that, even in the absence of an end effector or robot peripheral equipment, can perform a robot teaching task by assuming that they are present.

According to a first aspect of the present invention, there is provided a robot system comprising: a control apparatus for controlling a robot; and a video display apparatus connected to the control apparatus, wherein the video display apparatus comprises: a display unit which displays an image of a real space containing the robot, in real time as the image is taken by a camera; and an augmented reality image processing unit which causes a virtual image of an end effector or robot peripheral equipment of the robot to be displayed on the display unit in superimposed fashion on a real image of the robot taken by the camera.

According to a second aspect of the present invention, the video display apparatus in the robot system of the first aspect further comprises a virtual object image generating unit which, based on relative position and angle between the robot and the camera, generates the virtual image of the end effector or the robot peripheral equipment to be displayed in superimposed fashion on the real image of the robot taken by the camera.

According to a third aspect of the present invention, the augmented reality image processing unit in the robot system of the first or second aspect is configured to cause the virtual image of the end effector or the robot peripheral equipment to be displayed on the display unit while moving the virtual image based on position/orientation data of the robot being controlled by the control apparatus or on a pseudo-signal received from the control apparatus.

According to a fourth aspect of the present invention, the control apparatus in the robot system of any one of the first to third aspect includes a teach operation panel which is used to perform operation to teach the robot.

According to a fifth aspect of the present invention, the video display apparatus in the robot system of any one of the first to fourth aspect is a head-mounted display equipped with the camera.

BRIEF DESCRIPTION OF THE DRAWINGS

These and other objects, features, and advantages of the present invention will become more apparent from the detailed description of the typical embodiments given below with reference to the accompanying drawings, wherein.

DETAILED DESCRIPTION

Embodiments of the present invention will be described below with reference to the drawings. Throughout the drawings, the same component members or functional elements are designated by the same reference numerals. Further, for ease of understanding, the members or elements in the drawings are not necessarily drawn to scale.

Figure 1:
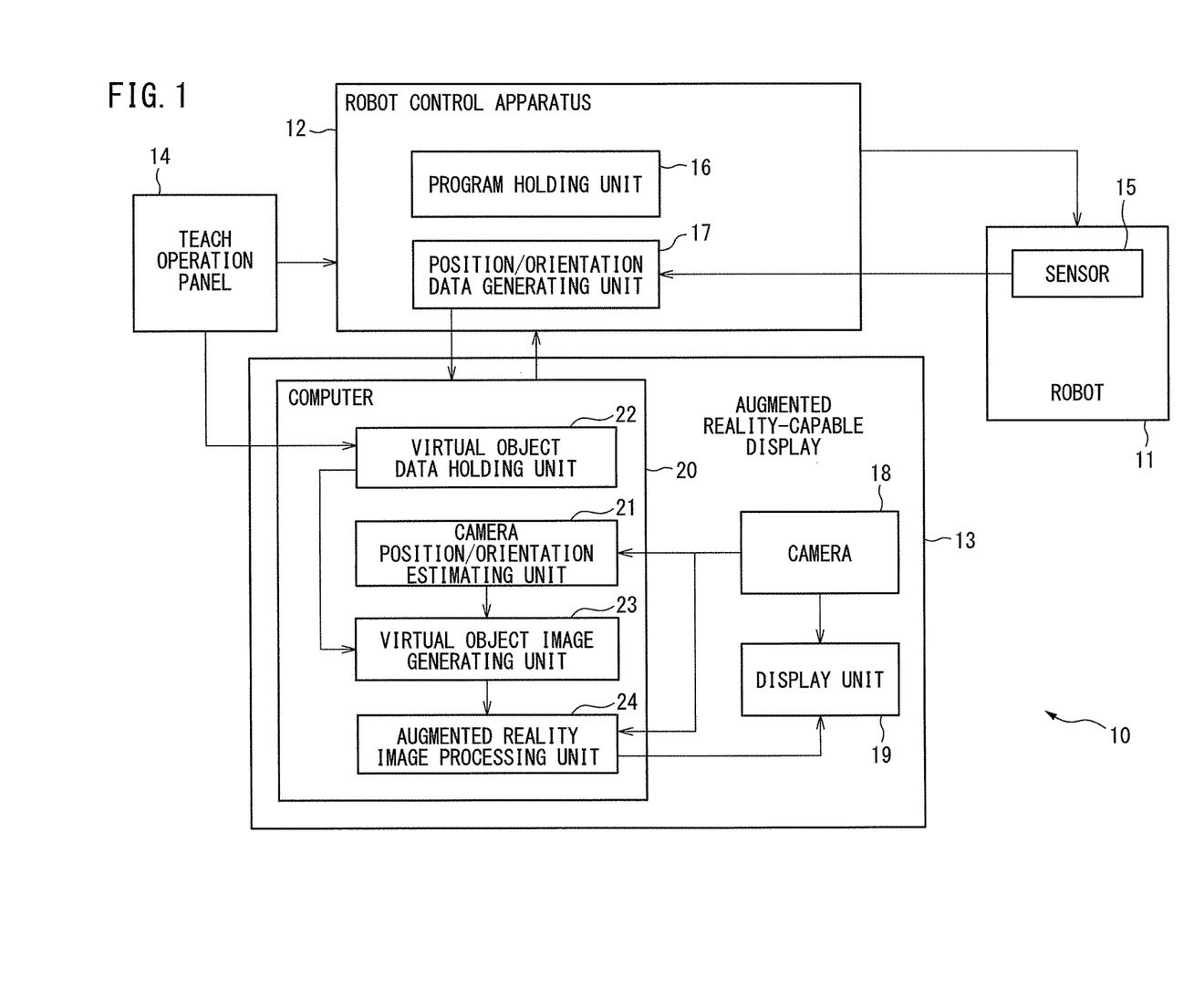
FIG. 1 is a block diagram showing a robot system according to one embodiment of the present invention.

FIG. 1 is a block diagram showing a robot system according to one embodiment of the present invention. As shown in FIG. 1, the robot system 10 of the present embodiment comprises a robot 11, a robot control apparatus 12 for controlling the robot 11, an augmented reality-capable display 13 as a video display apparatus which is connected to the robot control apparatus 12, and a teach operation panel 1 which is connected to the robot control apparatus 12 and used to perform operation to teach the robot 11.

The robot 11 is, for example, a vertically articulated manipulator. Servo motors (not shown) are provided, one for each articulated axis of the robot 11. The robot 11 is further provided with a position detection sensor 15, for example, a pulse encoder, for detecting the axial position (rotation angle) of each servo motor.

A mounting portion (not shown) to which a detachable end effector, such as a robot hand or a machining tool, is mounted is provided at the forward end of the arm of the robot 11.

The robot control apparatus 12 has the function of generating a control signal and driving the robot 11 in accordance with an operation program. The robot control apparatus 12 not only outputs the control signal to the robot 11 but receives signals from the augmented reality-capable display 13 and the teach operation panel 14.

The robot control apparatus 12 includes a program holding unit 16 which holds the operation program of the robot 11, and a position/orientation data generating unit 17 which generates position/orientation data relating to the robot 11.

The operation program of the robot 11 is input from the teach operation panel 14 to the program holding unit 16. The operation program held in the program holding unit 16 can be rewritten from the teach operation panel 14.

The robot control apparatus 12 supplies a position command to the servo motor in accordance with the operation program held in the program holding unit 16, and controls the servo motor so that the position of the servo motor detected by the position detection sensor 15 matches the position command. The robot 11 is thus controlled to operate in accordance with the operation program held in the program holding unit 16.

Based on a servo motor position signal output from the position detection sensor 15, the position/orientation data generating unit 17 generates position/orientation data relating to the robot 11, and outputs the generated data to the augmented reality-capable display 13.

When performing a robot teaching task, the operator operates the robot 11 from the teach operation panel 14 while viewing the display produced through the augmented reality-capable display 13. During this process, a sequence of actions necessary to accomplish a desired task is taught to the robot 11 from the teach operation panel 14 via the robot control apparatus 12.

When performing such a robot teaching task, there are cases where the end effector, such as a robot hand or a machining tool, to be attached to the forward end of the arm of the robot 11 cannot be made available. There are also cases where the robot peripheral equipment, such as a belt conveyor or a rail-guided cart for conveying workpieces, cannot be arranged in the vicinity of the robot 11. To address such cases, the robot system 10 of the present embodiment is configured so that the end effector or the robot peripheral equipment can be displayed as a virtual image on the augmented reality-capable display 13.

More specifically, as shown in FIG. 1, the augmented reality-capable display 13 comprises a camera 18 for shooting a real space containing the robot 11, a display unit 19 for displaying an image of the real space containing the robot 11, in real time as the image is taken by the camera 18, and a computer 20.

Figure 3:
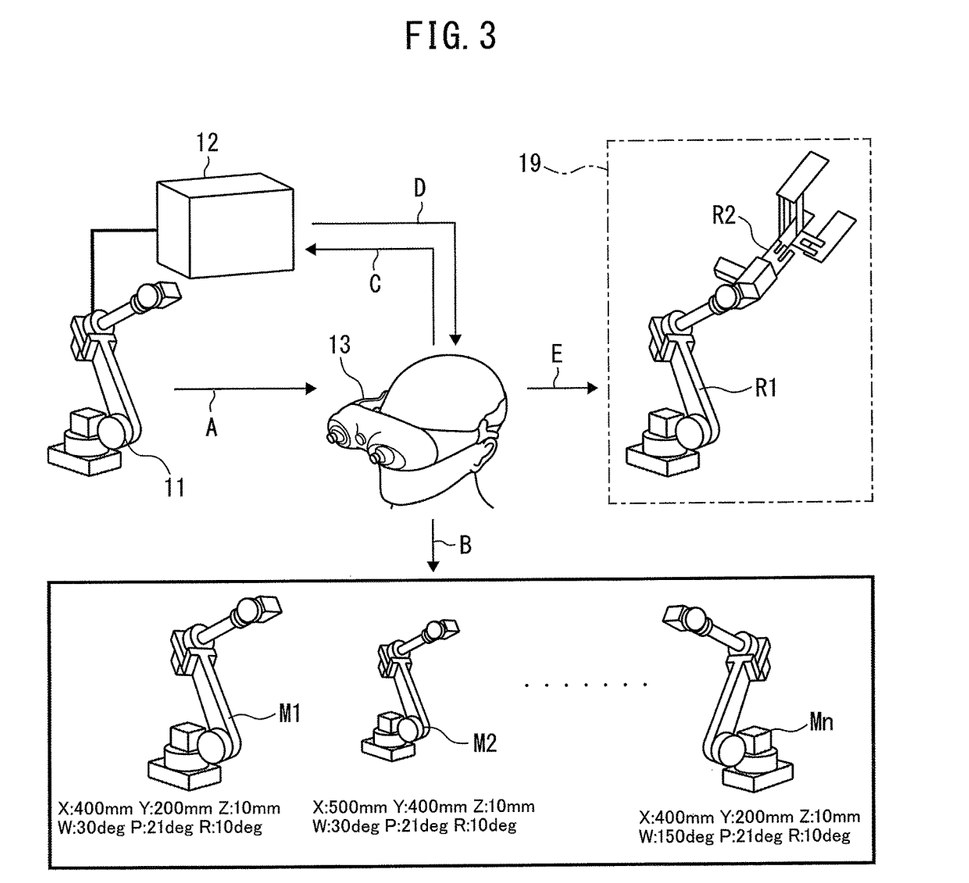
FIG. 3 is a diagram schematically illustrating how a first embodiment is implemented.
Figure 5:
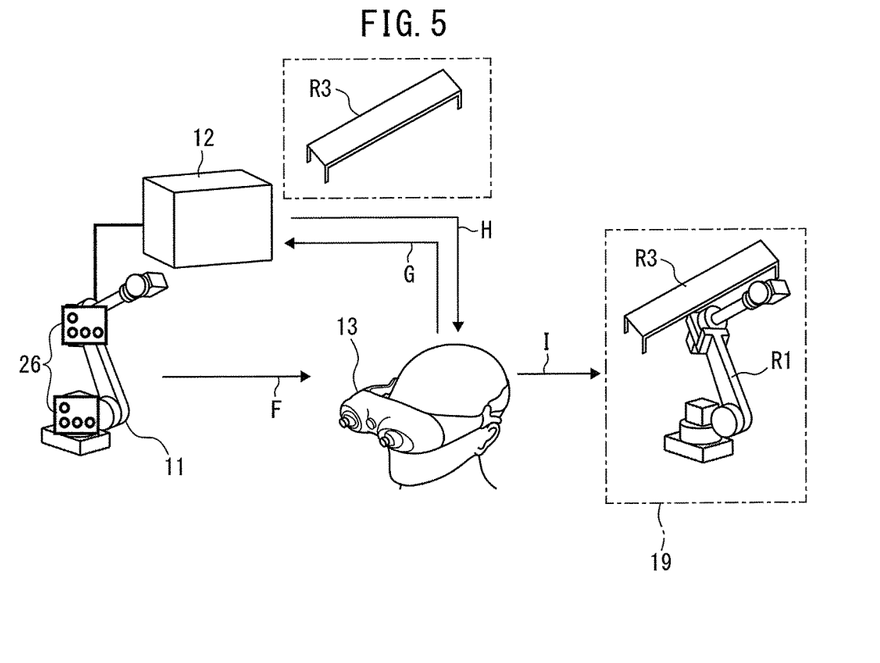
FIG. 5 is a diagram schematically illustrating how a second embodiment is implemented.

The augmented reality-capable display 13 is, for example, a head-mounted display (see FIGS. 3 and 5). In this case, the display unit 19 preferably has display screens, each about the size of a spectacle lens, arranged so as to correspond with the two eyes of a human. The augmented reality-capable display 13 is not limited to a head-mounted display, the only requirement being that the operator be able to view the image captured by the camera 18, while holding the teach operation panel 14 in his hand.

The computer 20 incorporated in the augmented reality-capable display 13 comprises, as shown in FIG. 1, a camera position/orientation estimating unit 21, a virtual object data holding unit 22, a virtual object image generating unit 23, and an augmented reality image processing unit 24. However, the virtual object data holding unit 22 and the virtual object image generating unit 23 may be incorporated in the robot control apparatus 12.

The camera position/orientation estimating unit 21 estimates the position and angle (orientation) of the camera 18 relative to the robot 11 to be taken by the camera 18.

The virtual object data holding unit 22 holds data relating to a virtual object that is not present in the real space in which the robot 11 is located. The virtual object data is input from the teach operation panel 14 to the virtual object data holding unit 22. The virtual object data is data representing the three-dimensional shape and location of the end effector, the robot peripheral equipment, or the like.

The virtual object data held in the virtual object data holding unit 22 is input to the virtual object image generating unit 23. Further, the data representing the relative position and angle (relative position and orientation) between the robot 11 and the camera 18 is input from the camera position/orientation estimating unit 21 to the virtual object image generating unit 23.

Based on the virtual object data and the data representing the relative position and angle between the robot 11 and the camera 18, the virtual object image generating unit 23 generates the image of the virtual object that matches the real image of the robot 11 taken by the camera 18. Here, when the relative position and angle between the robot 11 and the camera 18 changes, the image of the virtual image is changed accordingly to match the real image of the robot 11.

Image information of the virtual object generated by the virtual object image generating unit 23 is input to the augmented reality image processing unit 24.

Further, the position/orientation data being generated during the operation of the robot 11 is input from the position/orientation data generating unit 17 in the robot control apparatus 12 to the augmented reality image processing unit 24 via the computer 20. The real image information of the robot 11 taken by the camera 18 is also input to the augmented reality image processing unit 24.

Then, based on the position/orientation data of the robot 11, the augmented reality image processing unit 24 superimposes the image of the virtual object generated by the virtual object image generating unit 23 onto the real image of the robot 11 for display on the display unit 19. During the operation of the robot 11, it is preferable that the image data of the virtual object to be superimposed on the real image of the robot 11 is updated at predetermined intervals of time, based on the position/orientation data of the robot 11 in operation.

Figure 2:
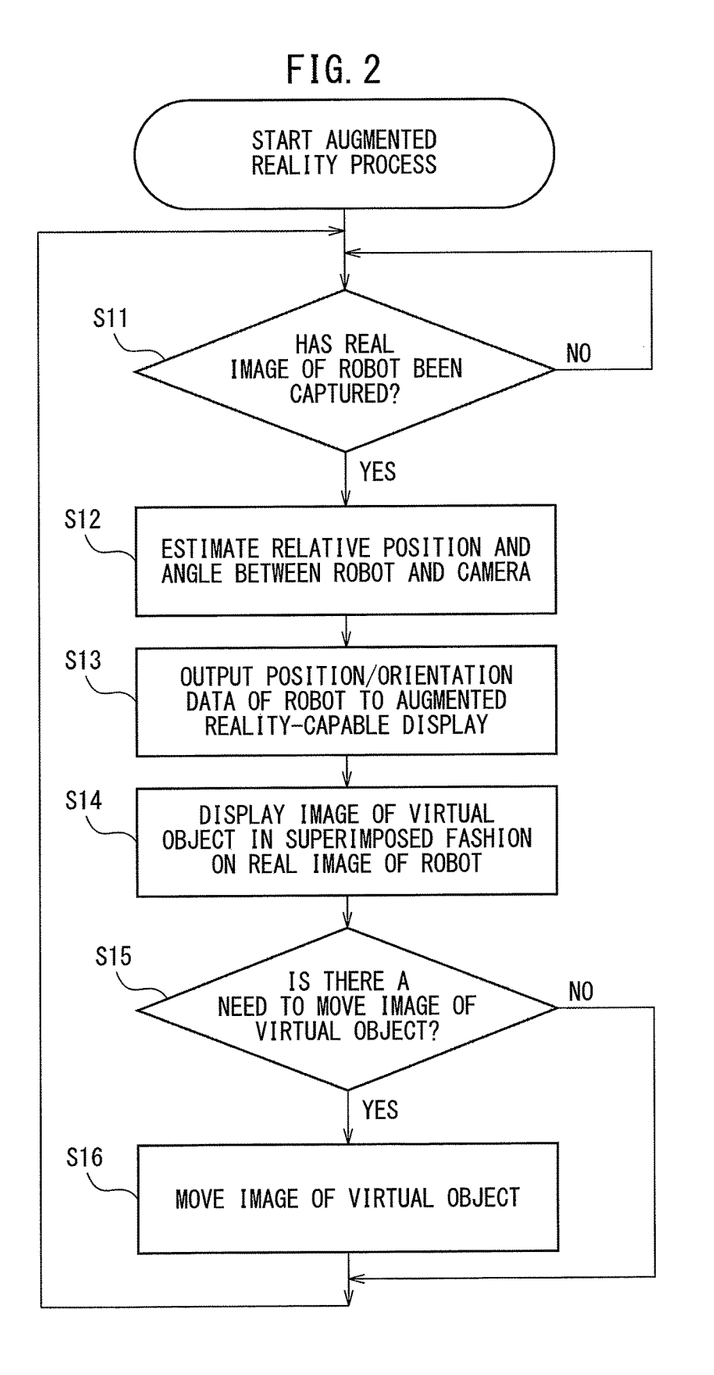
FIG. 2 is a flowchart illustrating an operation flow performed when displaying an image of a virtual object by superimposing it on a real image of a robot.

FIG. 2 is a flowchart illustrating an operation flow performed when displaying the image of the virtual object, such as the end effector or the robot peripheral equipment, by superimposing it on the real image of the robot 11 taken by the camera 18.

As shown in FIG. 2, first the augmented reality-capable display 13 determines whether or not the real image of the robot 11 has been captured via the camera 18 (step S11).

If it is determined that the real image of the robot 11 has been captured, the camera position/orientation estimating unit 21 in the augmented reality-capable display 13 estimates the relative position and angle between the robot 11 and the camera 18 (step S12).

After the above step S12, the position/orientation data generating unit 17 in the robot control apparatus 12 outputs the position/orientation data of the robot 11 to the augmented reality-capable display 13 (step S13).

Next, the augmented reality-capable display 13 displays the image of the virtual object, such as the end effector or the robot peripheral equipment, by superimposing it on the real image of the robot 11 taken by the camera 18 (step S14). In this case, the image of the virtual object is created based on the relative position and angle between the robot 11 and the camera 18 and, based on the position/orientation data of the robot 11, the image of the virtual object is superimposed on the real image of the robot 11, as earlier described.

Further, the augmented reality-capable display 13 determines whether or not the superimposed display image, that is, the image of the virtual object superimposed on the real image of the robot 11, needs to be moved (step S15).

When a change occurs in the position/orientation data of the robot 11 that the position/orientation data generating unit 17 outputs to the augmented reality-capable display 13, the augmented reality-capable display 13 determines in the above step S15 that the "YES" branch should be taken.

If it is determined in the above step S15 that the "YES" branch should be taken, the augmented reality-capable display 13 moves the superimposed display image (step S16). To accomplish this, the superimposed display image data is updated at predetermined intervals of time, based on the position/orientation data of the robot 11 in operation.

An example in which an image of a virtual end effector is superimposed on the real image of the real-world robot 11 (hereinafter called the first embodiment) will be described in detail below.

Embodiment 1

FIG. 3 is a diagram schematically illustrating how the first embodiment is implemented.

When performing a robot teaching task, the operator wears the augmented reality-capable display 13, as shown in FIG. 3, and visually recognizes the robot 11 installed at a given place. At this point, the end effector, such as a robot hand or a machining tool, is not yet attached to the forward end of the arm of the robot 11. Likewise, the robot peripheral equipment, such as a belt conveyor or a rail-guided cart for conveying workpieces, is not yet arranged in the vicinity of the robot 11.

In such a real-world environment, the augmented reality-capable display 13 captures the image of the real-world environment containing the robot 11 taken by the camera 18 (see arrow A in FIG. 3).

Next, the camera position/orientation estimating unit 21 incorporated in the augmented reality-capable display 13 estimates the relative position and angle between the robot 11 and the camera 18. The reason for this is that when superimposing the image of the virtual end effector on the real image R1 of the real-world robot 11, the image R2 of the virtual end effector must be displayed in a proper orientation and position.

In the first embodiment, the relative position and angle between the robot 11 and the camera 18 is estimated in the following manner.

First, the robot 11 in various stationary orientations are taken from various viewpoints by the camera 18, and a plurality of image models of the robot 11 is recorded in the camera position/orientation estimating unit 21. At this time, the relative position and angle between the robot 11 and the camera 18 is also recorded for each acquired image model of the robot 11.

After that, when the real image R1 of the real-world robot 11 is captured into the augmented reality-capable display 13, as described above, the real image R1 of the real-world robot 11 thus captured is compared with the plurality of prerecorded image models $M_1, M_2, \ldots, M_n$ of the robot 11 (see arrow B in FIG. 3) to determine which image model is closest to the captured image. Then, the camera position/orientation estimating unit 21 assumes that the relative position and angle between the robot 11 and the camera 18, associated with the closest image model, represents the position and angle of the camera 18 relative to the robot 11 currently being taken by the camera 18.

Next, the camera position/orientation estimating unit 21 notifies the robot control apparatus 12 that the relative position and angle between the robot 11 and the camera 18 has been estimated (see arrow C in FIG. 3).

Thereupon, the position/orientation data generating unit 17 in the robot control apparatus 12 transmits the present position/orientation data of the robot 11 to the augmented reality-capable display 13 (see arrow D in FIG. 3).

Next, the virtual object image generating unit 23 incorporated in the augmented reality-capable display 13 generates the image R2 of the virtual end effector that matches the real image R1 of the robot 11 currently being taken by the camera 18. Here, the image R2 of the virtual end effector is generated based on the virtual object data stored and held in the virtual object data holding unit 22, i.e., the data representing the three-dimensional shape, etc., of the end effector, and on the relative position and angle between the robot 11 and the camera 18 estimated as described above. More specifically, the image R2 of the virtual end effector is generated as an image having a proper orientation, position, and size with respect to the forward end of the arm contained in the real image R1 of the robot 11 taken by the camera 18.

Then, the augmented reality image processing unit 24 incorporated in the augmented reality-capable display 13 causes the image R2 of the virtual end effector generated by the virtual object image generating unit 23 to be displayed on the display unit 19 in such a manner as to be added at the forward end of the arm in the real image R1 of the robot 11 taken by the camera 18 (see arrow E in FIG. 3). In this case, the position of the forward end of the arm in the real image R1 of the robot 11 is identified based on the position/orientation data of the robot 11 received from the robot control apparatus 12 and the relative position and angle between the robot 11 and the camera 18.

Figure 4:
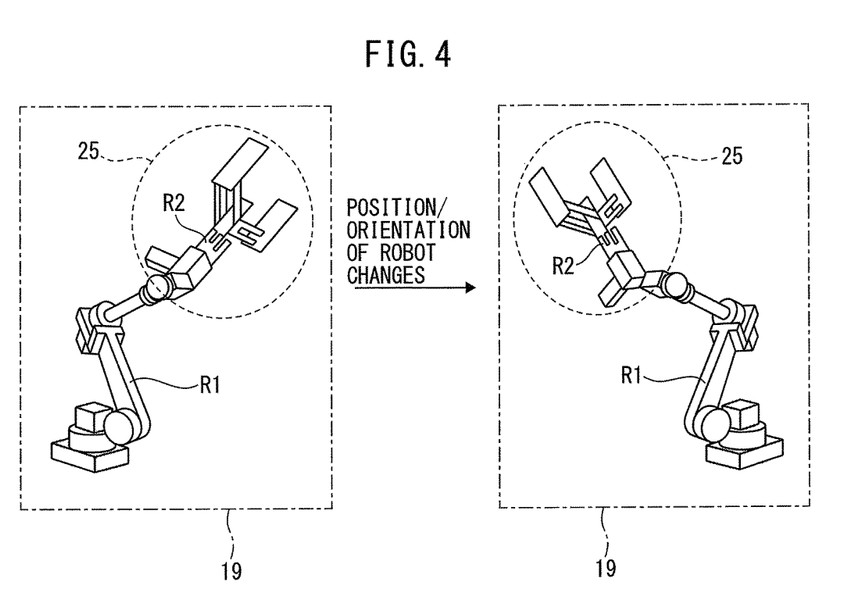
FIG. 4 is a diagram schematically illustrating how images displayed on a display unit of an augmented reality-capable display change as the robot is operated.

FIG. 4 is a diagram schematically illustrating how images displayed on the augmented reality-capable display 13 change as the robot 11 is operated.

When performing a robot teaching task, the operator operates the robot 11 by using the teach operation panel 14. Since the position/orientation of the robot 11 changes during operation, the real image R1 of the robot 11 displayed on the display unit 19 changes accordingly, as shown in FIG. 4. Then, based on the changing position/orientation data of the robot 11, the augmented reality image processing unit 24 updates the data of the image R2 of the virtual end effector to be displayed near the forward end of the arm in the real image R1 of the robot 11. Here, it is preferable that the image R2 of the virtual end effector is generated by the virtual object image generating unit 23 in real time as the real image R1 of the robot 11 changes. In this way, the image R2 of the virtual end effector (the image portion 25 encircled by a dashed line in FIG. 4) displayed near the forward end of the arm in the real image R1 of the robot 11 can be made to move as the real image R1 of the robot 11 changes.

According to the first embodiment described above, even when the end effector is not attached to the forward end of the arm of the robot 11, the robot teaching task can be performed using the augmented reality-capable display 13 by assuming that the end effector is present. Furthermore, since a head-mounted display is used as the augmented reality-capable display 13, the operator can operate the teach operation panel 14 while viewing the image captured by the camera 18 and displayed on the display unit 19.

Next, an example in which an image of virtual robot peripheral equipment is superimposed on the real image of the real-world robot 11 (hereinafter called the second embodiment) will be described in detail below.

Embodiment 2

FIG. 5 is a diagram schematically illustrating how the second embodiment is implemented.

When performing a robot teaching task, the operator wears the augmented reality-capable display 13, as shown in FIG. 5, and visually recognizes the robot 11 installed at a given place. At this point, the end effector, such as a robot hand or a machining tool, is not yet attached to the forward end of the arm of the robot 11. Likewise, the robot peripheral equipment, such as a belt conveyor or a rail-guided cart for conveying work, is not yet arranged in the vicinity of the robot 11.

In such a real-world environment, the augmented reality-capable display 13 captures the image of the real-world environment containing the robot 11 taken by the camera 18 (see arrow F in FIG. 5). However, in the second embodiment, at least one marker 26 is attached to the surface of the robot 11. It is preferable that the marker 26 has a prescribed shape or pattern that can be recognized as an image by the camera 18.

Next, the camera position/orientation estimating unit 21 incorporated in the augmented reality-capable display 13 estimates the relative position and angle between the robot 11 and the camera 18. The reason for this is the same as that described in the first embodiment.

In the second embodiment, the relative position and angle between the robot 11 and the camera 18 is estimated in the following manner.

A plurality of markers 26 is attached to the surface of the robot 11 installed in the real space, and an image of each marker 26 is captured by the camera 18. The position of each marker 26 in the real space is known. Accordingly, the position and orientation (angle) of the camera 18 in the real space coordinate system can be calculated from the position of each marker 26 projected on the image coordinate system of the camera 18. By this calculation, the camera position/orientation estimating unit 21 estimates the relative position and angle between the robot 11 and the camera 18. It is preferable that the image model of the desired robot peripheral equipment is associated with the position of each marker 26. Then, based on the position and orientation (angle) of the camera 18 in the real space coordinate system, data representing the image model of the desired robot peripheral equipment can be displayed in superimposed fashion on the desired position in the real image of the robot 11.

Next, the camera position/orientation estimating unit 21 notifies the robot control apparatus 12 of the thus calculated relative position and angle between the robot 11 and the camera 18 (see arrow G in FIG. 5). In the second embodiment, it is assumed that, unlike the configuration shown in FIG. 1, the virtual object data holding unit 22 and the virtual object image generating unit 23 are incorporated in the robot control apparatus 12.

The virtual object image generating unit 23 incorporated in the robot control apparatus 12 generates the image R3 of the virtual robot peripheral equipment, for example, a belt conveyor, to be added to the real image R1 of the robot 11 currently being taken by the camera 18. Here, the image R3 of the virtual robot peripheral equipment is generated based on the virtual object data stored and held in the virtual object data holding unit 22, i.e., the data representing the three-dimensional shape, etc., of the robot peripheral equipment, and on the relative position and angle between the robot 11 and the camera 18 calculated as described above. More specifically, the image R3 of the virtual robot peripheral equipment is generated as an image having a proper orientation, position, and size with respect to the real image R1 of the robot 11 taken by the camera 18.

Next, the robot control apparatus 12 transmits the image R3 of the virtual robot peripheral equipment generated by the virtual object image generating unit 23 to the augmented reality image processing unit 24 incorporated in the augmented reality-capable display 13 (see arrow H in FIG. 5).

Then, the augmented reality image processing unit 24 causes the image R3 of the virtual robot peripheral equipment generated by the virtual object image generating unit 23 to be displayed on the display unit 19 in superimposed fashion on the real image R1 of the robot 11 taken by the camera 18 (see arrow I in FIG. 5). In this case, the position at which the image R3 of the virtual peripheral equipment of the robot is displayed in superimposed fashion is identified based on the position of the marker 26 projected on the image coordinate system of the camera 18 and the relative position and angle between the robot 11 and the camera 18.

Preferably, the following method is employed to move the image R3 of the virtual robot peripheral equipment, for example, a belt conveyor, displayed in superimposed fashion on the real image of the robot 11. First, a plurality of moving images representing incremental movements of the movable belt portion of the virtual conveyor is created in advance and recorded in the virtual object data holding unit 22. The robot control apparatus 12 is configured to be able to generate a pseudo-signal for controlling the virtual belt conveyor and output it to the augmented reality-capable display 13 at a desired time. Then, in response to the input of the pseudo-signal from the robot control apparatus 12, the augmented reality-capable display 13 displays the moving images of the movable belt portion at predetermined intervals of time, each in a proper orientation, position, and size and in a superimposed fashion with respect to the real image of the robot 11.

According to the second embodiment described above, even when the robot peripheral equipment, such as a belt conveyor, is not actually arranged in the vicinity of the robot 11, the robot teaching task can be performed using the augmented reality-capable display 13 by assuming that the robot peripheral equipment is present. Furthermore, since a head-mounted display is used as the augmented reality-capable display 13, the operator can operate the teach operation panel 14 while viewing the image captured by the camera 18 and displayed on the display unit 19.

While the present invention has been described with reference to the typical embodiments thereof, it will be understood by those skilled in the art that the above and various other changes, omissions, and additions can be made to the above embodiments without departing from the scope of the present invention. It will also be recognized that suitably combining the above embodiments falls within the scope of the present invention.

ADVANTAGEOUS EFFECT OF THE INVENTION

According to the first, second, third, and fourth aspects of the present invention, even when the end effector or the robot peripheral equipment is not available for the robot, the robot teaching task can be performed using the video display apparatus by assuming that the end effector or the robot peripheral equipment is present.

According to the fifth aspect of the present invention, the operator can operate the teach operation panel while viewing the image captured by the camera and displayed on the display unit.

The invention claimed is:

1. A robot system comprising:
a control apparatus for controlling a robot; and
a video display apparatus connected to the control apparatus,
the video display apparatus including:
    a display unit configured to display, in real time, an image of a real space containing the robot taken by a camera;
    a camera position and orientation estimating unit configured to estimate a relative position and an angle between the robot and the camera based on comparison between the image of the real space and prerecorded image models;
    an augmented reality image processing unit configured to cause a virtual image of an end effector attached to the robot to be displayed on the display unit in superimposed fashion on a real image of the robot taken by the camera, the virtual image being generated based on the relative position and the angle estimated by the camera position and orientation estimating unit,
    wherein the augmented reality image processing unit is configured to cause the virtual image to be displayed on the display unit while moving the virtual image, based on position and orientation data of the robot being controlled by the control apparatus.

2. The robot system according to claim 1, wherein the video display apparatus further comprises a virtual object image generating unit configured to, based on relative position and angle between the robot and the camera, generate the virtual image to be displayed in superimposed fashion on the real image.

3. The robot system according to claim 1, wherein the control apparatus includes a teach operation panel which is used to perform operation to teach the robot.

4. The robot system according to claim 1, wherein the video display apparatus is a head-mounted display equipped with the camera.

5. A robot system comprising:
a control apparatus for controlling a robot; and
a video display apparatus connected to the control apparatus, the video display apparatus including:
    a display unit configured to display, in real time, an image of a real space containing the robot taken by a camera;
    a camera position and orientation estimating unit configured to estimate a relative position and angle between the robot and the camera;
    an augmented reality image processing unit configured to cause a virtual image of an end effector attached to the robot to be displayed on the display unit in superimposed fashion on a real image of the robot taken by the camera, the virtual image being generated based on the relative position and angle estimated by the camera position and orientation estimating unit; and
    a virtual image movement determination unit configured to determine that the virtual image needs to be moved, when a change occurs in position and orientation data of the robot being controlled by the control apparatus wherein,
    the augmented reality image processing unit is configured to cause the virtual image to be displayed on the display unit while moving the virtual image, based on the position and orientation data.

6. A robot system comprising:
a control apparatus for controlling a robot; and
a video display apparatus connected to the control apparatus, the video display apparatus including:
a display unit configured to display, in real time, an image of a real space containing the robot taken by a camera;
a camera position and orientation estimating unit configured to estimate a relative position and angle between the robot and the camera;
an augmented reality image processing unit configured to cause a virtual image of an end effector attached to the robot to be displayed on the display unit in superimposed fashion on a real image of the robot taken by the camera, the virtual image being generated based on the relative position and angle estimated by the camera position and orientation estimating unit; and
a virtual image movement determination unit configured to determine whether or not the virtual image superimposed on the real image needs to be moved based on position and orientation data of the robot being controlled by the control apparatus, wherein
upon determination that the virtual image superimposed on the real image needs to be moved, the augmented reality image processing unit is configured to move the virtual image and cause the virtual image to be displayed on the display unit while moving the virtual image.

7. The robot system according to claim 6, wherein, when the virtual image movement determination unit determines that the virtual image needs to be moved, the augmented reality image processing unit updates the virtual image superimposed on the real image so as to move the virtual image, based on the position and orientation data.

* * * * *